(12) United States Patent
Dallal et al.

(10) Patent No.: US 12,513,554 B2
(45) Date of Patent: Dec. 30, 2025

(54) TRANSMITTING OPTICAL BEACONS THAT INDICATE OPTICAL IDENTIFIERS

(71) Applicant: QUALCOMM Incorporated, San Diego, CA (US)

(72) Inventors: Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 17/808,014

(22) Filed: Jun. 21, 2022

(65) Prior Publication Data

US 2023/0413098 A1    Dec. 21, 2023

(51) Int. Cl.
*H04W 4/00* (2018.01)
*H04B 10/516* (2013.01)
*H04W 4/16* (2009.01)
*H04W 28/02* (2009.01)
*H04W 48/16* (2009.01)

(52) U.S. Cl.
CPC ...... *H04W 28/0215* (2013.01); *H04B 10/516* (2013.01); *H04W 4/16* (2013.01); *H04W 48/16* (2013.01)

(58) Field of Classification Search
CPC .... H04W 28/0215; H04W 4/16; H04W 48/16
See application file for complete search history.

(56) References Cited

U.S. PATENT DOCUMENTS

| | | | |
|---|---|---|---|
| 2016/0156419 A1* | 6/2016 | Druml | H04W 12/50 398/40 |
| 2017/0005716 A1* | 1/2017 | Reial | H04B 7/0408 |
| 2017/0265112 A1* | 9/2017 | Morita | H04W 36/0077 |

* cited by examiner

*Primary Examiner* — Omoniyi Obayanju
(74) *Attorney, Agent, or Firm* — QUALCOMM Incorporated

(57) ABSTRACT

Various aspects of the present disclosure generally relate to wireless communication. In some aspects, a user equipment (UE) may detect, via a camera of the UE, an optical beacon emitted from a network node, wherein the optical beacon is associated with a modulation with a repeated pattern that indicates an optical cell identifier associated with the network node. The UE may determine the optical cell identifier associated with the network node based at least in part on the optical beacon. The UE may communicate with the network node based at least in part on a beam association between the UE and the network node, wherein the beam association is based at least in part on the optical cell identifier associated with the network node. Numerous other aspects are described.

30 Claims, 15 Drawing Sheets

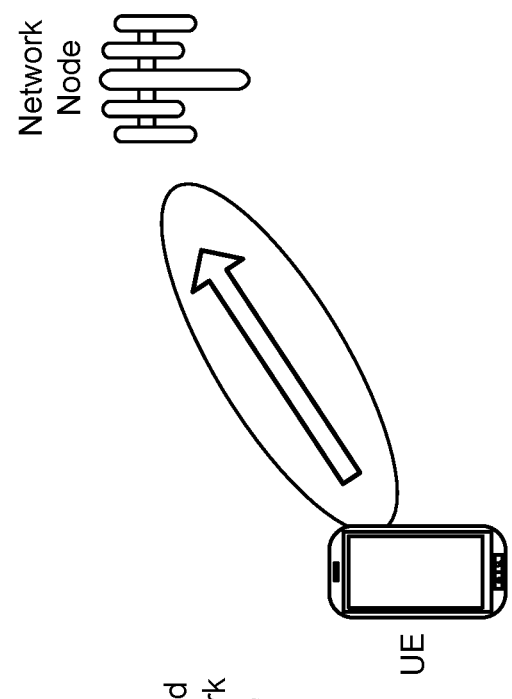
FIG. 8

TRANSMITTING OPTICAL BEACONS THAT INDICATE OPTICAL IDENTIFIERS

FIELD OF THE DISCLOSURE

Aspects of the present disclosure generally relate to wireless communication and to techniques and apparatuses for transmitting optical beacons that indicate optical identifiers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: detect, via a camera of the UE, an optical beacon emitted from a network node, wherein the optical beacon is associated with a modulation with a repeated pattern that indicates an optical cell identifier associated with the network node; determine the optical cell identifier associated with the network node based at least in part on the optical beacon; and communicate with the network node based at least in part on a beam association between the UE and the network node, wherein the beam association is based at least in part on the optical cell identifier associated with the network node.

In some implementations, an apparatus for wireless communication at a network node includes a memory and one or more processors, coupled to the memory, configured to: identify an optical beacon emitted from the network node, wherein the optical beacon is associated with a modulation with a repeated pattern that indicates an optical cell identifier associated with the network node; and communicate, with a UE, based at least in part on a beam association between the network node and the UE, wherein the beam association is based at least in part on the optical cell identifier associated with the network node.

In some implementations, an apparatus for wireless communication at a network node includes a memory and one or more processors, coupled to the memory, configured to: detect, via a camera of the network node, an optical beacon emitted from a UE, wherein the optical beacon is associated with a modulation with a repeated pattern that indicates an optical radio network temporary identifier (RNTI) associated with the UE; determine the optical RNTI associated with the UE based at least in part on the optical beacon; and perform a beam sweeping in a direction of the UE based at least in part on the optical RNTI associated with the UE.

In some implementations, an apparatus for wireless communication at a UE includes a memory and one or more processors, coupled to the memory, configured to: identify an optical beacon emitted from the UE, wherein the optical beacon is associated with a modulation with a repeated pattern that indicates an optical RNTI associated with the UE; and receive, from a network node, a beam that is based at least in part on the optical RNTI associated with the UE.

In some implementations, a method of wireless communication performed by a UE includes detecting, via a camera of the UE, an optical beacon emitted from a network node, wherein the optical beacon is associated with a modulation with a repeated pattern that indicates an optical cell identifier associated with the network node; determining the optical cell identifier associated with the network node based at least in part on the optical beacon; and communicating with the network node based at least in part on a beam association between the UE and the network node, wherein the beam association is based at least in part on the optical cell identifier associated with the network node.

In some implementations, a method of wireless communication performed by a network node includes identifying an optical beacon emitted from the network node, wherein the optical beacon is associated with a modulation with a repeated pattern that indicates an optical cell identifier associated with the network node; and communicating, with a UE, based at least in part on a beam association between the network node and the UE, wherein the beam association is based at least in part on the optical cell identifier associated with the network node.

In some implementations, a method of wireless communication performed by a network node includes detecting, via a camera of the network node, an optical beacon emitted from a UE, wherein the optical beacon is associated with a modulation with a repeated pattern that indicates an optical RNTI associated with the UE; determining the optical RNTI associated with the UE based at least in part on the optical beacon; and performing a beam sweeping in a direction of the UE based at least in part on the optical RNTI associated with the UE.

In some implementations, a method of wireless communication performed by a UE includes identifying an optical beacon emitted from the UE, wherein the optical beacon is associated with a modulation with a repeated pattern that indicates an optical RNTI associated with the UE; and receiving, from a network node, a beam that is based at least in part on the optical RNTI associated with the UE.

In some implementations, a non-transitory computer-readable medium storing a set of instructions for wireless communication includes one or more instructions that, when executed by one or more processors of a UE, cause the UE to: detect, via a camera of the UE, an optical beacon emitted from a network node, wherein the optical beacon is associated with a modulation with a repeated pattern that indicates an optical cell identifier associated with the network node; determine the optical cell identifier associated with the network node based at least in part on the optical beacon; and communicate with the network node based at least in part on a beam association between the UE and the network node, wherein the beam association is based at least in part on the optical cell identifier associated with the network node.

In some implementations, a non-transitory computer-readable medium storing a set of instructions for wireless communication includes one or more instructions that, when executed by one or more processors of a network node, cause the network node to: identify an optical beacon emitted from the network node, wherein the optical beacon is associated with a modulation with a repeated pattern that indicates an optical cell identifier associated with the network node; and communicate, with a UE, based at least in part on a beam association between the network node and the UE, wherein the beam association is based at least in part on the optical cell identifier associated with the network node.

In some implementations, a non-transitory computer-readable medium storing a set of instructions for wireless communication includes one or more instructions that, when executed by one or more processors of a network node, cause the network node to: detect, via a camera of the network node, an optical beacon emitted from a UE, wherein the optical beacon is associated with a modulation with a repeated pattern that indicates an optical RNTI associated with the UE; determine the optical RNTI associated with the UE based at least in part on the optical beacon; and perform a beam sweeping in a direction of the UE based at least in part on the optical RNTI associated with the UE.

In some implementations, a non-transitory computer-readable medium storing a set of instructions for wireless communication includes one or more instructions that, when executed by one or more processors of a UE, cause the UE to: identify an optical beacon emitted from the UE, wherein the optical beacon is associated with a modulation with a repeated pattern that indicates an optical RNTI associated with the UE; and receive, from a network node, a beam that is based at least in part on the optical RNTI associated with the UE.

In some implementations, an apparatus for wireless communication includes means for detecting, via a camera of the apparatus, an optical beacon emitted from a network node, wherein the optical beacon is associated with a modulation with a repeated pattern that indicates an optical cell identifier associated with the network node; means for determining the optical cell identifier associated with the network node based at least in part on the optical beacon; and means for communicating with the network node based at least in part on a beam association between the apparatus and the network node, wherein the beam association is based at least in part on the optical cell identifier associated with the network node.

In some implementations, an apparatus for wireless communication includes means for identifying an optical beacon emitted from the apparatus, wherein the optical beacon is associated with a modulation with a repeated pattern that indicates an optical cell identifier associated with the network node; and means for communicating, with a UE, based at least in part on a beam association between the apparatus and the UE, wherein the beam association is based at least in part on the optical cell identifier associated with the apparatus.

In some implementations, an apparatus for wireless communication includes means for detecting, via a camera of the apparatus, an optical beacon emitted from a UE, wherein the optical beacon is associated with a modulation with a repeated pattern that indicates an optical RNTI associated with the UE; means for determining the optical RNTI associated with the UE based at least in part on the optical beacon; and means for performing a beam sweeping in a direction of the UE based at least in part on the optical RNTI associated with the UE.

In some implementations, an apparatus for wireless communication includes means for identifying an optical beacon emitted from the apparatus, wherein the optical beacon is associated with a modulation with a repeated pattern that indicates an optical RNTI associated with the apparatus; and means for receiving, from a network node, a beam that is based at least in part on the optical RNTI associated with the apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-9 are diagrams illustrating examples associated with transmitting optical beacons that indicate optical identifiers, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
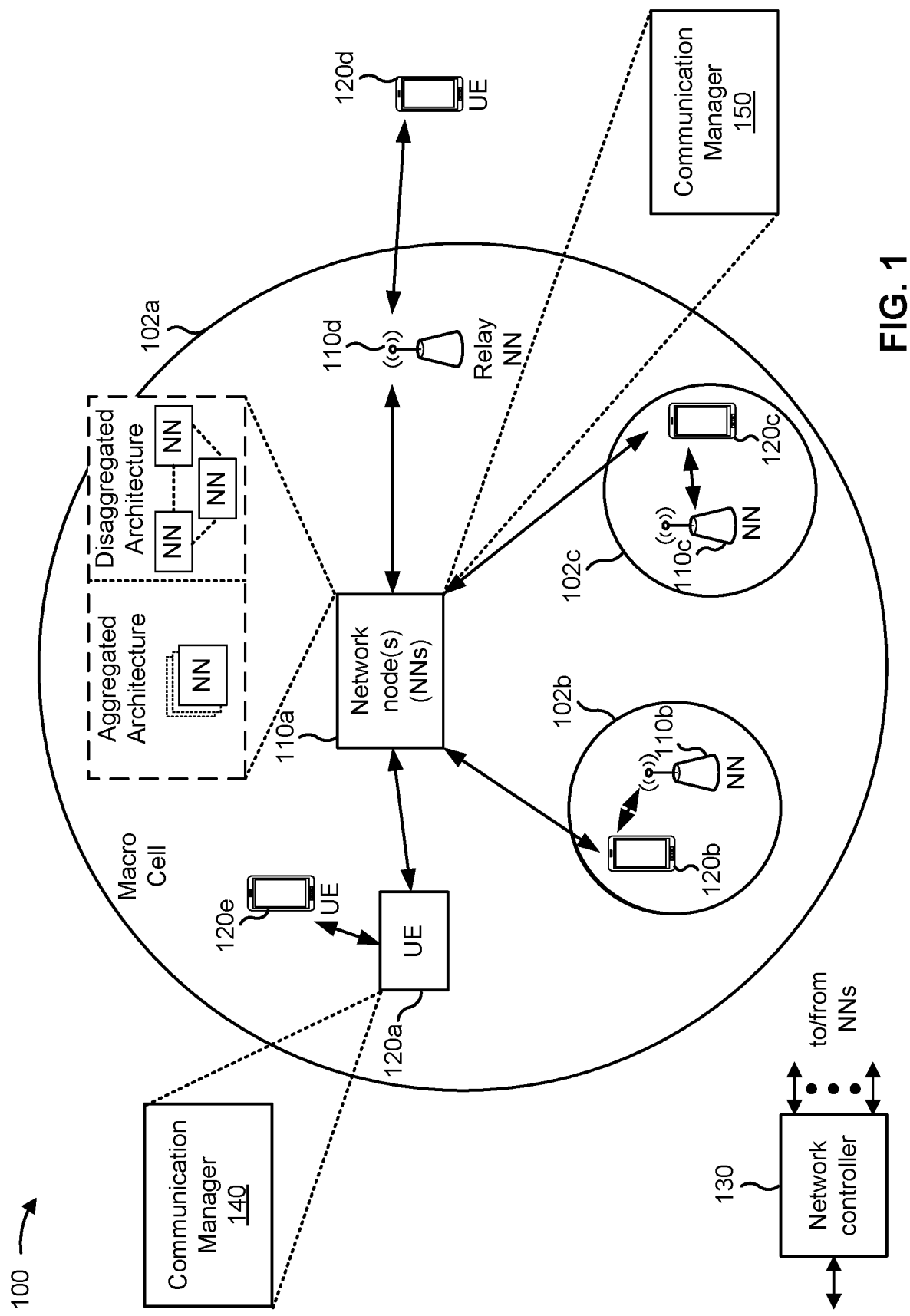
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may detect, via a camera of the UE, an optical beacon emitted from a network node, wherein the optical beacon is associated with a modulation with a repeated pattern that indicates an optical cell identifier associated with the network node; determine the optical cell identifier associated with the network node based at least in part on the optical beacon; and communicate with the network node based at least in part on a beam association between the UE and the network node, wherein the beam association is based at least in part on the optical cell identifier associated with the network node. Additionally, or alternatively, the communication manager 140 may perform one or more other operations described herein.

In some aspects, a network node (e.g., network node 110) may include a communication manager 150. As described in more detail elsewhere herein, the communication manager 150 may identify an optical beacon emitted from the network node, wherein the optical beacon is associated with a modulation with a repeated pattern that indicates an optical cell identifier associated with the network node; and communicate, with a UE, based at least in part on a beam association between the network node and the UE, wherein the beam association is based at least in part on the optical cell identifier associated with the network node. Additionally, or alternatively, the communication manager 150 may perform one or more other operations described herein.

In some aspects, a network node (e.g., network node 110) may include a communication manager 150. As described in more detail elsewhere herein, the communication manager 150 may detect, via a camera of the network node, an optical beacon emitted from a UE, wherein the optical beacon is associated with a modulation with a repeated pattern that indicates an optical radio network temporary identifier (RNTI) associated with the UE; determine the optical RNTI associated with the UE based at least in part on the optical beacon; and perform a beam sweeping in a direction of the UE based at least in part on the optical RNTI associated with the UE. Additionally, or alternatively, the communication manager 150 may perform one or more other operations described herein.

In some aspects, a UE (e.g., UE 120) may include a communication manager 140. As described in more detail elsewhere herein, the communication manager 140 may identify an optical beacon emitted from the UE, wherein the optical beacon is associated with a modulation with a repeated pattern that indicates an optical RNTI associated with the UE; and receive, from a network node, a beam that is based at least in part on the optical RNTI associated with the UE. Additionally, or alternatively, the communication manager 140 may perform one or more other operations described herein.

As indicated above, FIG. 1 is provided as an example. Other examples may differ from what is described with regard to FIG. 1.

Figure 2:
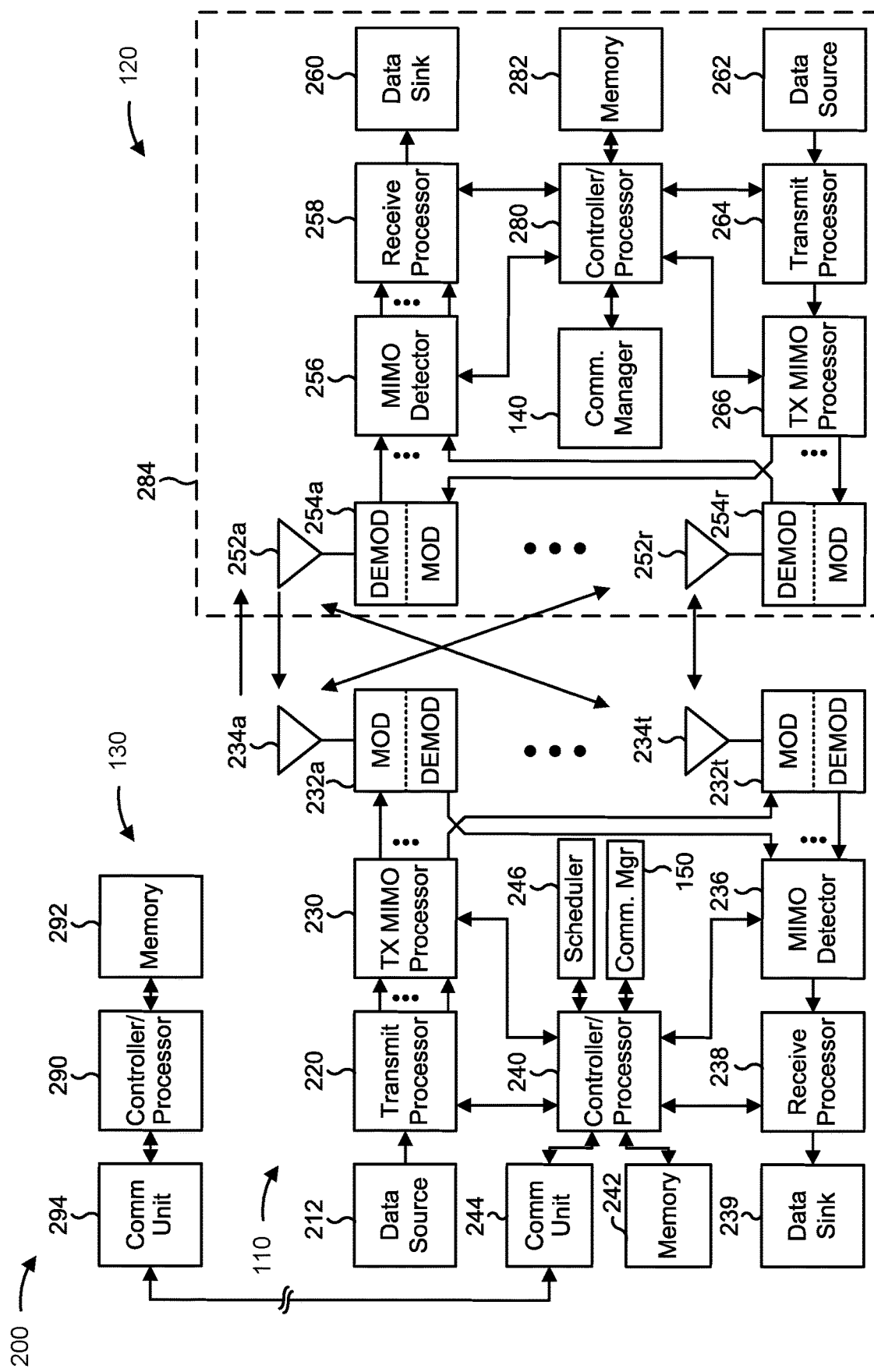
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-15).

The controller/processor 240 of the network node 110, the controller/processor 280 of the UE 120, and/or any other component(s) of FIG. 2 may perform one or more techniques associated with transmitting optical beacons that indicate optical identifiers, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a UE (e.g., UE 120) includes means for detecting, via a camera of the UE, an optical beacon emitted from a network node, wherein the optical beacon is associated with a modulation with a repeated pattern that indicates an optical cell identifier associated with the network node; means for determining the optical cell identifier associated with the network node based at least in part on the optical beacon; and/or means for communicating with the network node based at least in part on a beam association between the UE and the network node, wherein the beam association is based at least in part on the optical cell identifier associated with the network node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for identifying an optical beacon emitted from the network node, wherein the optical beacon is associated with a modulation with a repeated pattern that indicates an optical cell identifier associated with the network node; and/or means for communicating, with a UE, based at least in part on a beam association between the network node and the UE, wherein the beam association is based at least in part on the optical cell identifier associated with the network node. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network node (e.g., network node 110) includes means for detecting, via a camera of the network node, an optical beacon emitted from a UE, wherein the optical beacon is associated with a modulation with a repeated pattern that indicates an optical RNTI associated with the UE; means for determining the optical RNTI associated with the UE based at least in part on the optical beacon; and/or means for performing a beam sweeping in a direction of the UE based at least in part on the optical RNTI associated with the UE. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., UE 120) includes means for identifying an optical beacon emitted from the UE, wherein the optical beacon is associated with a modulation with a repeated pattern that indicates an optical RNTI associated with the UE; and/or means for receiving, from a network node, a beam that is based at least in part on the optical RNTI associated with the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
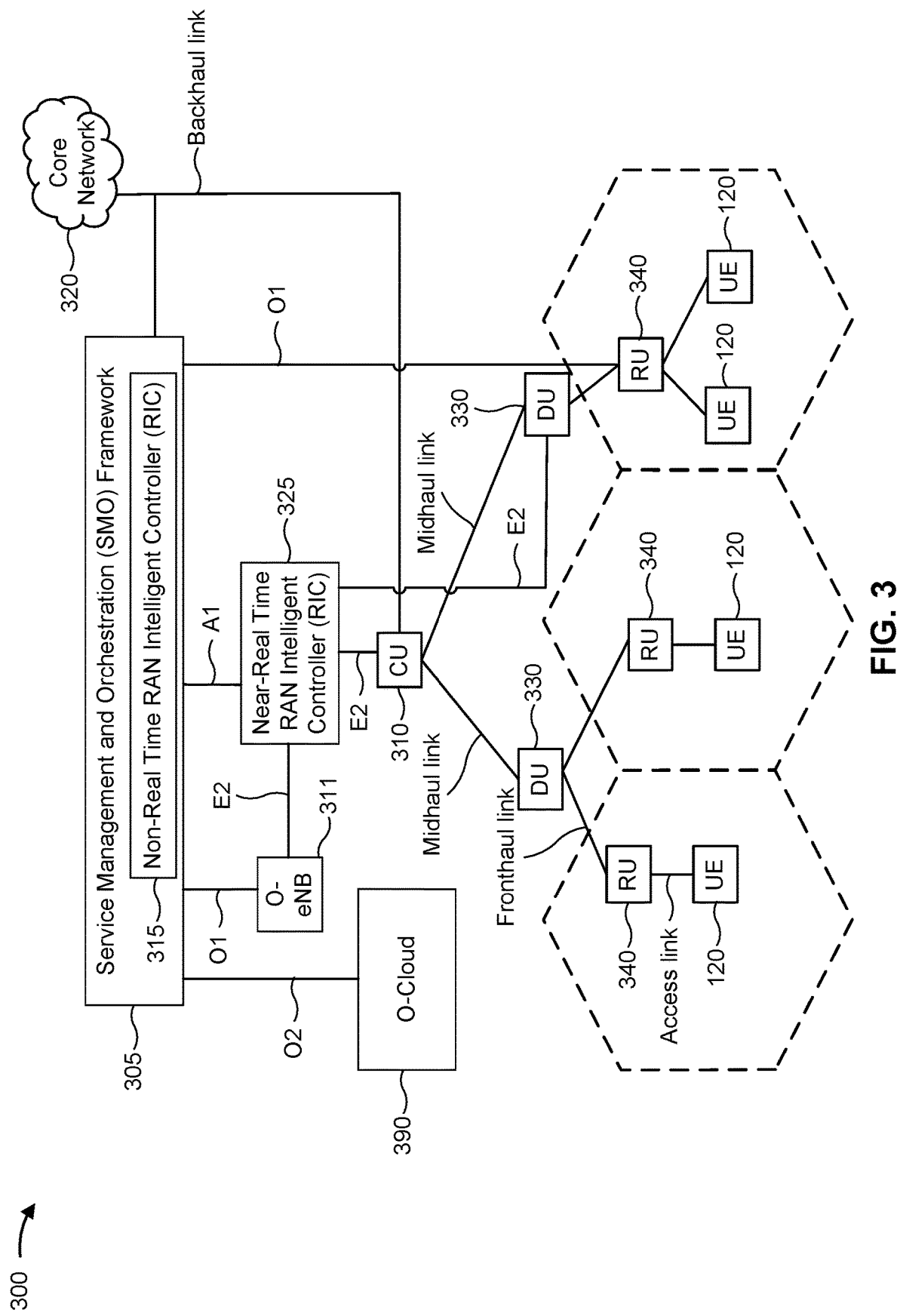
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

As operational frequencies increase from mmW frequency ranges to sub-THz frequency ranges, beam widths may decrease linearly while a quantity of beams may increase quadratically. For example, when increasing from 28 GHz to 140 GHz, a ⅕ beam width may result in 25 times (e.g., ×25) a quantity of beams for the same array area. With such a large quantity of beams available, favorable angular coverage must rely on wide beams with low gain and poor energy collection with reduced coverage (e.g., due to small effective apertures), or suffer from increasing scanning overhead from having to scan over a large quantity of narrow beams. As a result, networks may rely on supplemental information for improving beam management, which may include global positioning system (GPS) information, other RAT positioning information (e.g., positioning information associated with sub-6 GHz, mmW, and/or sub-THz frequency ranges), sensor fusion information, localized handover information, and/or road traffic control information.

One approach may involve an optical beacon for a sub-THz initial acquisition and beam tracking, in which an initial beam acquisition may be based at least in part on a camera assisted technique. Such an approach is described in FIGS. 4 and 5.

Figure 4:
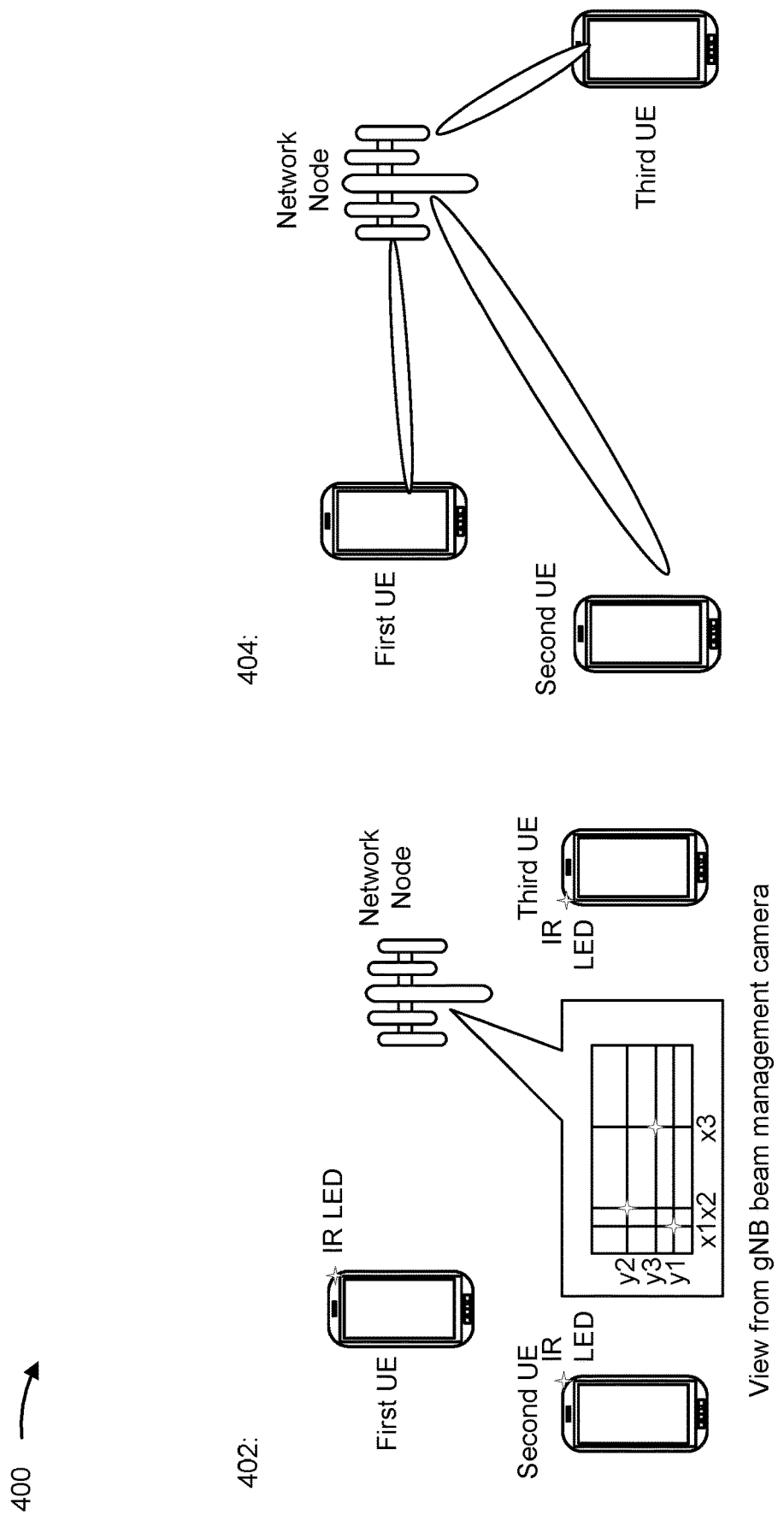
FIGS. 4-5 are diagrams illustrating examples of optical beacon and camera assisted beam selections, in accordance with the present disclosure.

FIG. 4 is a diagram illustrating an example 400 of an optical beacon and camera assisted beam selection, in accordance with the present disclosure. As shown in FIG. 4, communication may occur between a network node (e.g., network node 110) and a plurality of UEs (e.g., UE 120). In some aspects, the network node and the plurality of UEs may be included in a wireless network, such as wireless network 100.

As shown by reference number 402, during a network node side beam selection, the plurality of UEs (e.g., a first UE, a second UE, and a third UE), which may be in distinct directions with respect to the network node, may be instructed to emit their optical beacons (e.g., via infrared (IR) light emitting diodes (LEDs)). The plurality of UEs may each emit their optical beacons based at least in part on UE capabilities, network node capabilities, and/or signaling between the network node and the plurality of UEs. The network node may include a camera, such as a low pixel count camera, which may be used by the network node for beam management. The network node may use the camera, which may have a wide field of view, to detect optical beacons emitted from the plurality of UEs. The network node may identify corresponding beams based at least in part on the detection of the optical beacons using the camera. For example, a view from the camera may indicate a first optical beacon associated with a first position (e.g., x2, y2), a second optical beacon associated with a second position (e.g., x1, y1), and a third optical beacon associated with a third position (e.g., x3, y3). The first optical beacon may be associated with the first UE, the second optical beacon may be associated with the second UE, and the third optical beacon may be associated with the third UE.

As shown by reference number 404, the network node may perform a subsequent beam sweep, which may use a reduced quantity of beams around optically identified directions. The subsequent beam sweep may involve a first beam in a first direction associated with the first optical beacon, a second beam in a second direction associated with the second optical beacon, and a third beam in a third direction associated with the third optical beacon. The network node may not need to transmit beams in directions that are not associated with optically identified directions, thereby saving resources used by the network node. As a result, a beam selection performed by the network node may be an optical beacon and camera assisted beam selection.

As indicated above, FIG. 4 is provided as an example. Other examples may differ from what is described with regard to FIG. 4.

Figure 5:
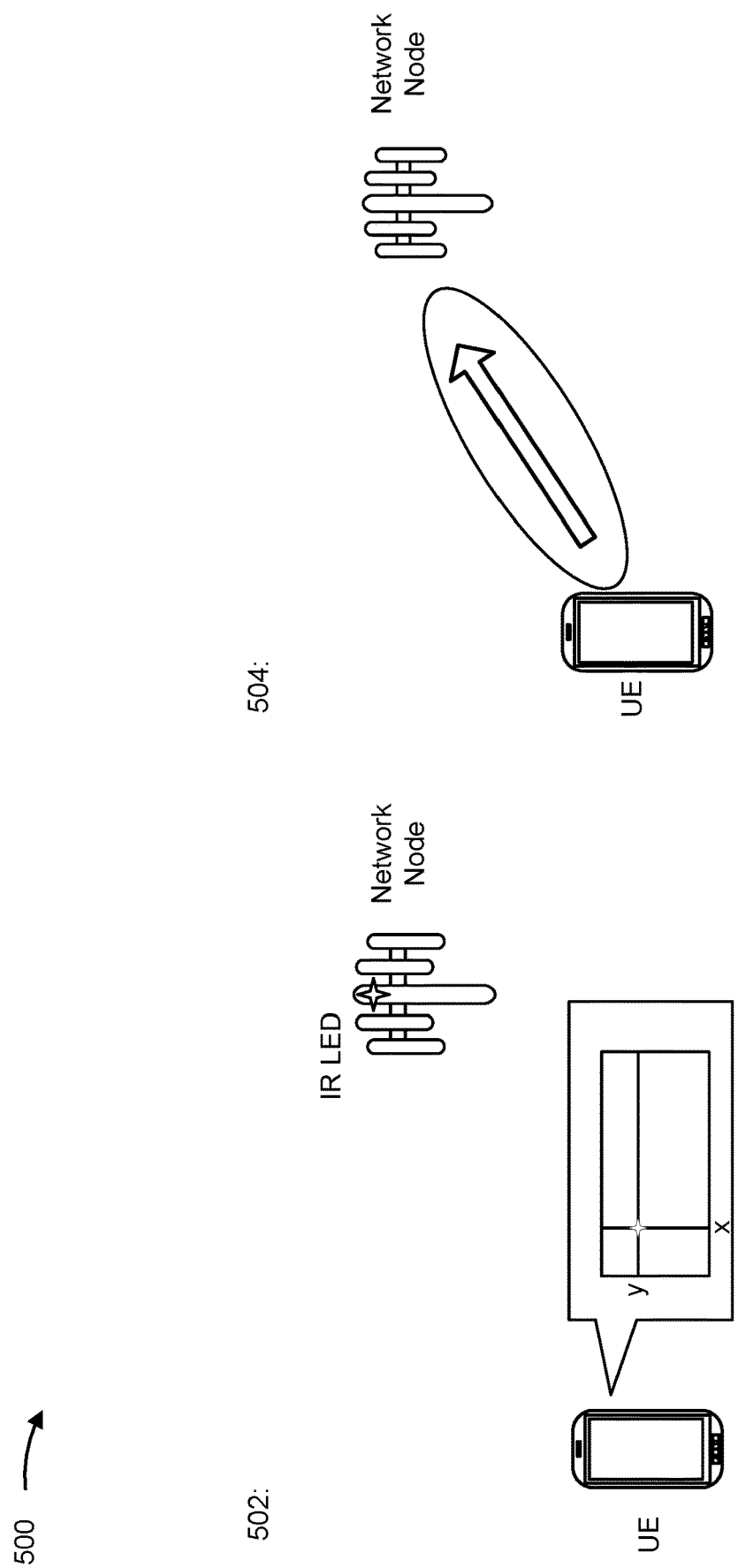

FIG. 5 is a diagram illustrating an example 500 of an optical beacon and camera assisted beam selection, in accordance with the present disclosure. As shown in FIG. 5, communication may occur between a network node (e.g., network node 110) and a UE (e.g., UE 120). In some aspects, the network node and the UE may be included in a wireless network, such as wireless network 100.

As shown by reference number 502, during a UE-side beam selection, the network node may emit an optical beacon (e.g., via an IR LED) from an antenna of the network node. The network node may emit (or shine) the optical beacon during a synchronization signal block (SSB) period, or following an indication from a lower band. The UE may include a camera (e.g., a low pixel count infrared camera, which may be configured to capture images associated with infrared wavelengths), which may be used by the UE for beam management. The UE may use the camera to detect the optical beacon emitted by the network node. When using the camera, each pixel may correspond to a typical UE beam width, and the camera may employ a large quantity of pixels to achieve a high sensitivity. For example, a view from the camera may indicate an optical beacon associated with a position (e.g., x, y). The optical beacon may be associated with the network node. The UE may perform minimal image processing to identify a direction and/or location of the network node, as well as a corresponding panel and beam. When multiple network nodes are identified, or false identifications occur, the UE may use other information from a cell to resolve discrepancies and to identify the network node of interest.

As shown by reference number 504, the UE may communicate with the network node using the beam, where beam information associated with the beam may be derived using the image processing. The beam may be associated with the direction and/or the location of the network node.

As indicated above, FIG. 5 is provided as an example. Other examples may differ from what is described with regard to FIG. 5.

When using optical beacon assisted initial acquisition and tracking, a problem may occur when the network node identifies multiple UEs, as the network node may be unable to uniquely identify UEs and to distinguish a certain UE from other UEs. Similarly, a problem may occur when a UE identifies multiple network nodes, as the UE may be unable to uniquely identify network nodes and to distinguish a certain network node from other network nodes. In other words, uniquely identifying network nodes and/or UEs that have optical capabilities may be difficult.

In various aspects of techniques and apparatuses described herein, a UE may detect, via a camera of the UE, an optical beacon emitted from a network node of a plurality of network nodes. The optical beacon may be associated with a modulation with a repeated pattern that indicates an optical cell identifier associated with the network node. The UE may determine the optical cell identifier associated with the network node based at least in part on the optical beacon. The UE may communicate with the network node based at least in part on a beam association between the UE and the network node, where the beam association may be based at least in part on the optical cell identifier associated with the network node.

In some aspects, the network node may detect, via a camera of the network node, an optical beacon emitted from a UE of a plurality of UEs. The optical beacon may be associated with a modulation with a repeated pattern that indicates an optical RNTI associated with the UE. The UE may determine the optical RNTI associated with the UE based at least in part on the optical beacon. The UE may perform a beam sweeping in a direction of the UE based at least in part on the optical RNTI associated with the UE.

In some aspects, UEs and network nodes may be identified by using optical blink patterns on optical beacons. The UEs may be identified based at least in part on optical RNTIs associated with the UEs, and the network nodes may be identified based at least in part on optical cell identifiers associated with the network nodes. The optical beacons may be used to determine UE or network node directions and to uniquely identify the UEs and the network nodes with respect to each other. The UEs and the network nodes may be able to transmit the optical beacons based at least in part on UE capabilities, network node capabilities, and/or signaling between the network nodes and the UEs. Emitting the optical beacons via infrared LEDs and detecting the optical beacons via infrared cameras may provide various advantages, such as a larger field of view, one shot capturing instead of a raster scan, performance that is independent of an angle associated with a sub-THz beam, a fixed scan time regardless of angular coverage and a sub-THz beamwidth, an improved initial acquisition procedure assisted by an optical mechanism, and/or a reduction in UE complexity when performing a cell search (e.g., when an optical cell identifier is coupled with a cell identifier).

Figure 6:
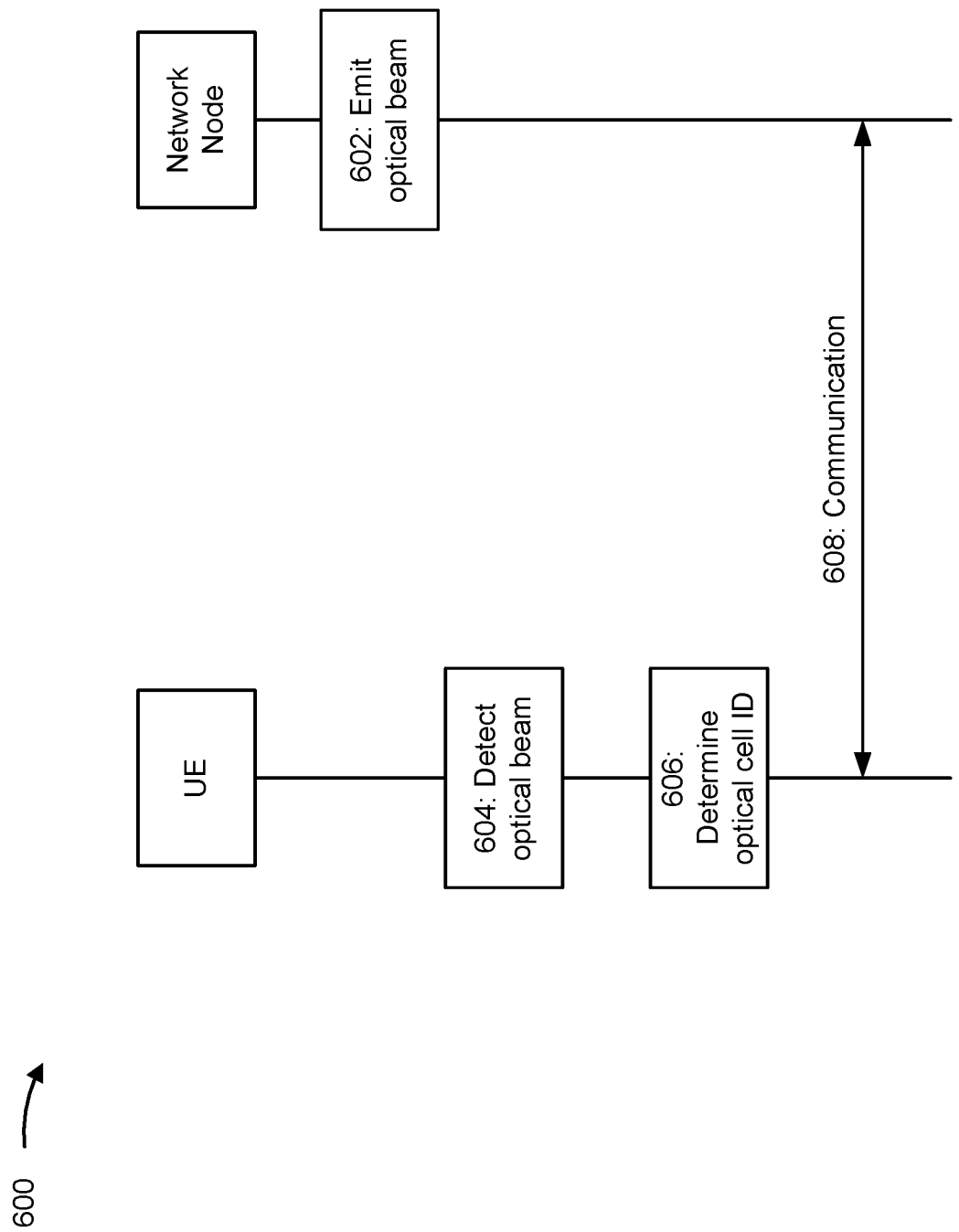

FIG. 6 is a diagram illustrating an example 600 associated with transmitting optical beacons that indicate optical identifiers, in accordance with the present disclosure. As shown in FIG. 6, communication may occur between a UE (e.g., UE 120) and a network node (e.g., network node 110). In some aspects, the UE and the network node may be included in a wireless network, such as wireless network 100.

As shown by reference number 602, the network node may emit an optical beacon. The network node, of a plurality of network nodes, may emit the optical beacon using an IR LED of the network node. The optical beacon may be associated with a modulation with a repeated pattern that indicates an optical cell identifier associated with the network node. The modulation may be an on-off keying (OOK) modulation. The modulation with the repeated pattern may correspond to an optical blinking pattern. The optical cell identifier associated with the network node may correspond to a network cell identifier associated with the network node.

As shown by reference number 604, the UE may detect the optical beacon emitted from the network node. The UE may detect the optical beacon using a camera of the UE, which may be an infrared camera.

As shown by reference number 606, the UE may determine the optical cell identifier associated with the network node based at least in part on the optical beacon. The UE may identify the modulation with the repeated pattern associated with the optical beacon, and based at least in part on the modulation with the repeated pattern associated with the optical beacon, the UE may determine the optical cell identifier associated with the network node. The optical beacon emitted from the network node may be used by the UE to uniquely identify the network node. The UE may be able to distinguish between different network nodes, of the plurality of network nodes, based at least in part on optical cell identifiers associated with the different network nodes.

As shown by reference number 608, the UE may communicate with the network node based at least in part on a beam association between the UE and the network node. The beam association may be based at least in part on the optical cell identifier associated with the network node. Further, the UE may communicate with the network node based at least in part on a cell association. The cell association may be based at least in part on the optical cell identifier associated with the network node. In other words, an ability to differentiate between the different network nodes based at least in part on different optical cell identifiers may assist the UE in following beam association and cell association procedures.

In some aspects, the UE and/or the network node may transmit capability information to each other. The UE may transmit, to the network node, capability signaling indicating that the UE is capable of detecting optical beacons emitted from the network node and/or determining optical cell identifiers based at least in part on the optical beacons. The network node may transmit, to the UE, capability signaling indicating that the UE is capable of emitting optical beacons. The UE and the network node may receive the capability signaling from each other.

As indicated above, FIG. 6 is provided as an example. Other examples may differ from what is described with regard to FIG. 6.

Figure 7:
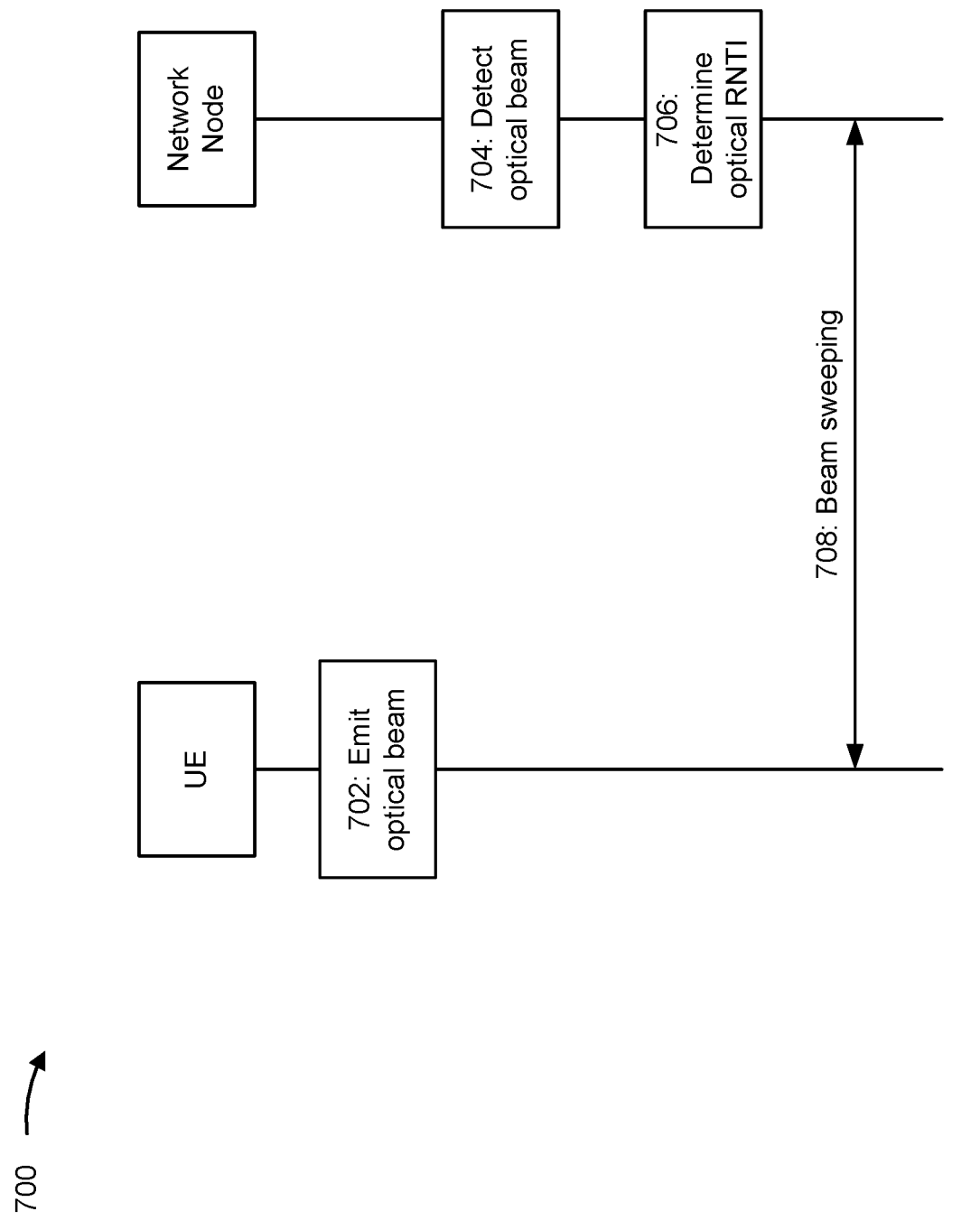

FIG. 7 is a diagram illustrating an example 700 associated with transmitting optical beacons that indicate optical identifiers, in accordance with the present disclosure. As shown in FIG. 7, communication may occur between a UE (e.g., UE 120) and a network node (e.g., network node 110). In some aspects, the UE and the network node may be included in a wireless network, such as wireless network 100.

As shown by reference number 702, the UE may emit an optical beacon. The UE, of a plurality of UEs, may emit the optical beacon using an IR LED of the UE. The optical beacon may be associated with a modulation with a repeated pattern that indicates an optical RNTI associated with the UE. The modulation may be an OOK modulation. The modulation with the repeated pattern may correspond to an optical blinking pattern. The optical RNTI may be based at least in part on a non-optical RNTI (e.g., a usual RNTI), an NG 5G shortened temporary mobile subscription identifier (S-TMSI), or some other type of standard UE identifier.

In some aspects, the UE may receive, from the network node, a configuration that indicates the optical RNTI associated with the UE, which may enable the UE to emit the optical beam that is modulated with the repeated pattern to indicate the optical RNTI associated with the UE. The UE may receive the configuration that indicates the optical RNTI associated with the UE via a sub-6 GHz message. In some aspects, the optical RNTI may be based at least in part on an optical cell identifier associated with the network node. In some aspects, the optical RNTI may be unique to the UE, and an association between an RNTI and the optical RNTI may be established after a random access channel (RACH) procedure between the network node and the UE.

As shown by reference number 704, the network node may detect the optical beacon emitted from the UE. The network node may detect the optical beacon using a camera of the network node, which may be an infrared camera.

As shown by reference number 706, the network node may determine the optical RNTI associated with the UE based at least in part on the optical beacon. The network node may identify the modulation with the repeated pattern associated with the optical beacon, and based at least in part on the modulation with the repeated pattern associated with the optical beacon, the network node may determine the optical RNTI associated with the network node. The optical beacon emitted from the UE may be used by the network node to uniquely identify the UE. The network node may be able to distinguish between different UEs, of the plurality of network nodes, based at least in part on optical RNTIs associated with the different UEs.

As shown by reference number 708, the network node may perform a beam sweeping in a direction of the UE based at least in part on the optical RNTI associated with the UE. The UE may receive, from the network node, a beam that is based at least in part on the optical RNTI associated with the UE. The UE may receive the beam during the beam sweeping performed by the network node. When performing the beam sweeping, the network node may be able to uniquely identify the UE to which the beam is being directed, where the network node may uniquely identify the UE based at least in part on the optical RNTI associated with the UE.

In some aspects, the UE and/or the network node may transmit capability information to each other. For example, the UE may transmit, to the network node, capability signaling indicating that the UE is capable of emitting optical beacons. The network node may transmit, to the UE, capability signaling indicating that the network node is capable of detecting optical beacons emitted from the UE and/or determining optical RNTIs based at least in part on the optical beacons. The UE and the network node may receive the capability information from each other.

As indicated above, FIG. 7 is provided as an example. Other examples may differ from what is described with regard to FIG. 7.

FIG. 8 is a diagram illustrating an example 800 associated with transmitting optical beacons that indicate optical identifiers, in accordance with the present disclosure. As shown in FIG. 8, communication may occur between a UE (e.g., UE 120) and a plurality of network nodes (e.g., network nodes 110), which may include a first network node and a second network node.

As shown by reference number 802, during a UE-side beam selection, the plurality of network nodes may each emit optical beacons (e.g., via IR LEDs) from antennas of the plurality of network nodes. When emitting the optical beacons, the plurality of network nodes may each apply an OOK modulation with a repeated pattern. The repeated pattern may convey an optical cell identifier associated with a network node. The optical cell identifier of the network node may correspond to a network cell identifier associated with the network node. For example, the first network node may emit a first optical beacon in accordance with a first OOK pattern, and the second network node may emit a second optical beacon in accordance with a second OOK pattern. The plurality of network nodes may be in distinct directions with respect to the UE.

In some aspects, the UE may include a camera (e.g., a low pixel count infrared camera), which may be used by the UE for beam management. The UE may use the camera to detect the optical beacons emitted by the plurality of network nodes. For example, a view from the camera may indicate the first optical beacon associated with a first position (e.g., x1, y1), and the second optical beacon associated with a second position (e.g., x2, y2). The first optical beacon may be associated with the first network node and the first OOK pattern, and the second optical beacon may be associated with the second network node and the second OOK pattern. The UE may perform minimal image processing to identify directions and/or locations of each of the plurality of network nodes, as well as corresponding panels and beams. The UE may determine a first optical cell identifier associated with the first network node based at least in part on the first OOK pattern, and the UE may determine a second optical cell identifier associated with the second network node based at least in part on the second OOK pattern. The UE may be able to differentiate between the plurality of network nodes that are detected based at least in part on identified optical cell identifiers associated with the network nodes, which may assist the UE in performing beam association and cell association procedures.

As shown by reference number 804, the UE may communicate with the network node, of the plurality of network nodes, using an appropriate beam, where the network node may be identifiable based at least in part on the optical cell identifier associated with the network node. The UE may communicate with the network node based at least in part on the beam association and cell association procedures, which may be based at least in part on the optical cell identifier associated with the network node.

As indicated above, FIG. 8 is provided as an example. Other examples may differ from what is described with regard to FIG. 8.

Figure 9:
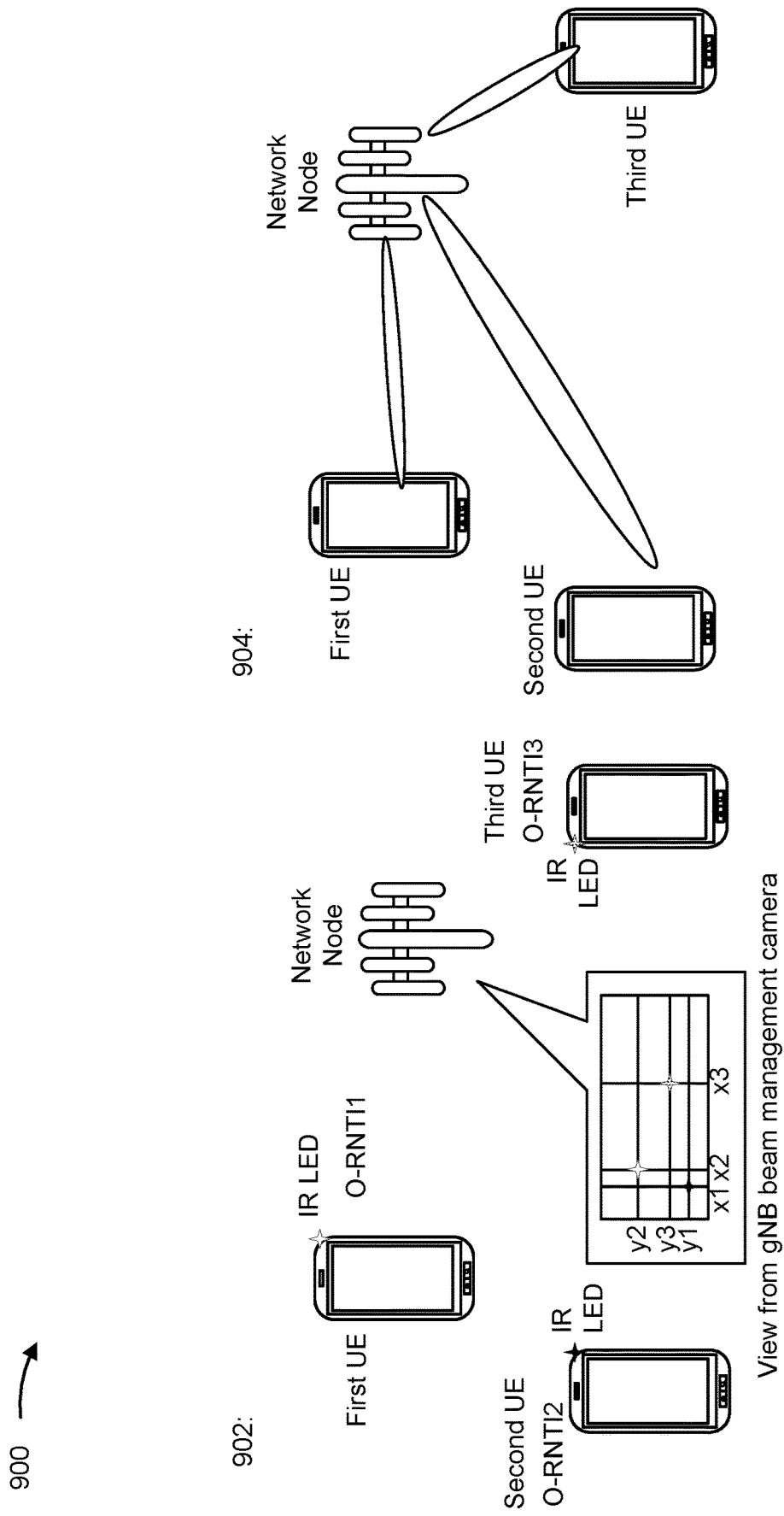

FIG. 9 is a diagram illustrating an example 900 associated with transmitting optical beacons that indicate optical identifiers, in accordance with the present disclosure. As shown in FIG. 9, communication may occur between a network node (e.g., network node 110) and a plurality of UEs (e.g., UEs 120), which may include a first UE, a second UE, and a third UE.

As shown by reference number 902, the plurality of UEs, which may be in distinct directions with respect to the network node, may each be assigned an optical RNTI by the network node. Optical RNTIs may be assigned to the plurality of UEs using sub-6 GHz messages. Alternatively, the optical RNTIs may be inferred from optical cell identifiers, which may be conveyed to the plurality of UEs. The optical RNTIs may be inferred from the optical cell identifiers within a limited set of valid numbers. In some cases, an optical RNTI may be unique to each UE, and an association between an RNTI and an optical RNTI may be made after a RACH process.

In some aspects, during a network node side beam selection, the plurality of UEs may be instructed to emit optical beacons (e.g., via IR LEDs), which may be based at least in part on UE capabilities, network node capabilities, and/or signaling between the network node and the plurality of UEs. When emitting the optical beacons, the plurality of UEs may each apply an OOK modulation with a repeated pattern. The repeated pattern may convey an optical RNTI associated with a UE. For example, the first UE may emit a first optical beacon in accordance with a first OOK pattern, the second UE may emit a second optical beacon in accordance with a second OOK pattern, and the third UE may emit a third optical beacon in accordance with a second OOK pattern.

In some aspects, the network node may include a camera, such as a low pixel count camera, which may be used by the network node for beam management. The network node may use the camera, which may have a wide field of view, to detect optical beacons emitted from the plurality of UEs. For example, a view from the camera may indicate a first optical beacon associated with a first position (e.g., x2, y2), a second optical beacon associated with a second position (e.g., x1, y1), and a third optical beacon associated with a third position (e.g., x3, y3). The first optical beacon may be associated with the first UE and the first OOK pattern, the second optical beacon may be associated with the second UE and the second OOK pattern, and the third optical beacon may be associated with the third UE and the third OOK pattern. The network node may associate each visible optical beacon to a unique UE. The network node may perform minimal image processing to identify directions and/or locations of each of the plurality of UEs, as well as corresponding beams. The network node may determine the first optical RNTI associated with the first UE based at least in part on the first OOK pattern, the network node may determine the second optical RNTI associated with the second UE based at least in part on the second OOK pattern, and the network node may determine the third optical RNTI associated with the third UE based at least in part on the third OOK pattern. The network node may be able to differentiate between the plurality of UEs that are detected based at least in part on identified optical RNTIs associated with the UEs, which may assist the network node in performing beam association procedures.

As shown by reference number 904, the network node may perform a subsequent beam sweep, which may use a reduced quantity of beams around optically identified directions. The subsequent beam sweep may involve a first beam in a first direction associated with the first optical beacon, a second beam in a second direction associated with the second optical beacon, and a third beam in a third direction associated with the third optical beacon, where the network may be able to distinguish between different UEs based on corresponding optical RNTIs.

As indicated above, FIG. 9 is provided as an example. Other examples may differ from what is described with regard to FIG. 9.

Figure 10:
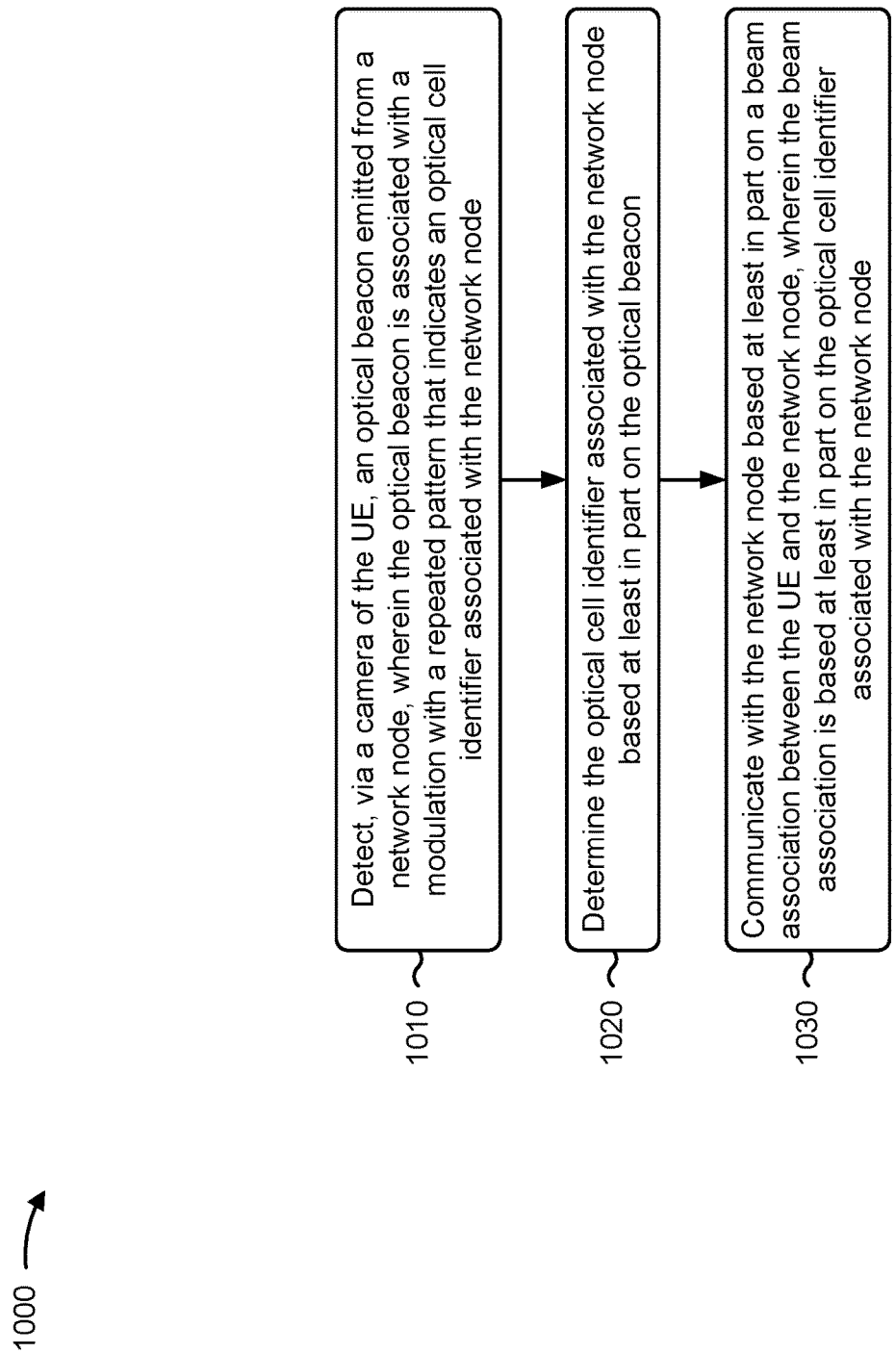
FIGS. 10-13 are diagrams illustrating example processes associated with transmitting optical beacons that indicate optical identifiers, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with transmitting optical beacons that indicate optical identifiers.

As shown in FIG. 10, in some aspects, process 1000 may include detecting, via a camera of the UE, an optical beacon emitted from a network node, wherein the optical beacon is associated with a modulation with a repeated pattern that indicates an optical cell identifier associated with the network node (block 1010). For example, the UE (e.g., using communication manager 140 and/or detection component 1408, depicted in FIG. 14) may detect, via a camera of the UE, an optical beacon emitted from a network node, wherein the optical beacon is associated with a modulation with a repeated pattern that indicates an optical cell identifier associated with the network node, as described above.

As further shown in FIG. 10, in some aspects, process 1000 may include determining the optical cell identifier associated with the network node based at least in part on the optical beacon (block 1020). For example, the UE (e.g., using communication manager 140 and/or determination component 1410, depicted in FIG. 14) may determine the optical cell identifier associated with the network node based at least in part on the optical beacon, as described above.

As further shown in FIG. 10, in some aspects, process 1000 may include communicating with the network node based at least in part on a beam association between the UE and the network node, wherein the beam association is based at least in part on the optical cell identifier associated with the network node (block 1030). For example, the UE (e.g., using communication manager 140, and/or reception component 1402 and/or transmission component 1404, depicted in FIG. 14) may communicate with the network node based at least in part on a beam association between the UE and the network node, wherein the beam association is based at least in part on the optical cell identifier associated with the network node, as described above.

Process 1000 may include additional aspects, such as any single aspect or any combination of aspects described below and/or in connection with one or more other processes described elsewhere herein.

In a first aspect, the optical cell identifier associated with the network node corresponds to a network cell identifier associated with the network node.

In a second aspect, alone or in combination with the first aspect, communicating with the network node is based at least in part on a cell association, and the cell association is based at least in part on the optical cell identifier associated with the network node.

In a third aspect, alone or in combination with one or more of the first and second aspects, the modulation is an OOK modulation that corresponds to an optical blinking pattern.

In a fourth aspect, alone or in combination with one or more of the first through third aspects, process 1000 includes transmitting, to the network node, capability signaling indicating that the UE is capable of detecting optical beacons emitted from the network node.

In a fifth aspect, alone or in combination with one or more of the first through fourth aspects, the optical beacon emitted from the network node is used to uniquely identify the network node.

In a sixth aspect, alone or in combination with one or more of the first through fifth aspects, the camera of the UE is an infrared camera.

In a seventh aspect, alone or in combination with one or more of the first through sixth aspects, the optical beacon is emitted from the network node using an infrared LED.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
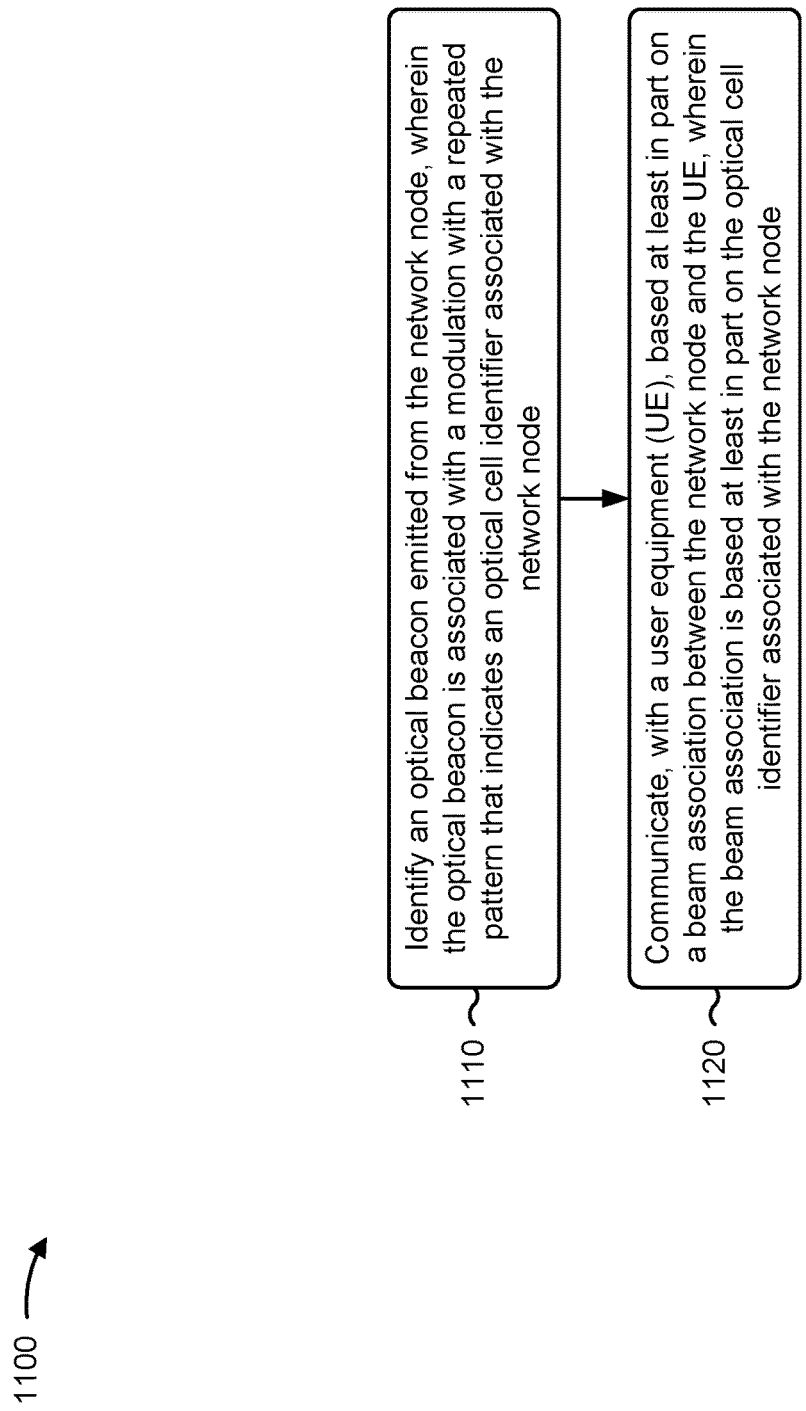

FIG. 11 is a diagram illustrating an example process 1100 performed, for example, by a network node, in accordance with the present disclosure. Example process 1100 is an example where the network node (e.g., network node 110) performs operations associated with transmitting optical beacons that indicate optical identifiers.

As shown in FIG. 11, in some aspects, process 1100 may include identifying an optical beacon emitted from the network node, wherein the optical beacon is associated with a modulation with a repeated pattern that indicates an optical cell identifier associated with the network node (block 1110). For example, the network node (e.g., using communication manager 150 and/or identification component 1508, depicted in FIG. 15) may identify an optical beacon emitted from the network node, wherein the optical beacon is associated with a modulation with a repeated pattern that indicates an optical cell identifier associated with the network node, as described above.

As further shown in FIG. 11, in some aspects, process 1100 may include communicating, with a UE, based at least in part on a beam association between the network node and the UE, wherein the beam association is based at least in part on the optical cell identifier associated with the network node (block 1120). For example, the network node (e.g., using communication manager 150, and/or reception component 1502 and/or transmission component 1504, depicted in FIG. 15) may communicate, with a UE, based at least in part on a beam association between the network node and the UE, wherein the beam association is based at least in part on the optical cell identifier associated with the network node, as described above.

Process 1100 may include additional aspects, such as any single aspect or any combination of aspects described below and/or in connection with one or more other processes described elsewhere herein.

In a first aspect, the optical cell identifier associated with the network node corresponds to a network cell identifier associated with the network node.

In a second aspect, alone or in combination with the first aspect, the modulation is an OOK modulation that corresponds to an optical blinking pattern.

In a third aspect, alone or in combination with one or more of the first and second aspects, process 1100 includes receiving, from the UE, capability signaling indicating that the UE is capable of detecting optical beacons emitted from the network node.

In a fourth aspect, alone or in combination with one or more of the first through third aspects, the optical beacon emitted from the network node is used to uniquely identify the network node.

In a fifth aspect, alone or in combination with one or more of the first through fourth aspects, the optical beacon is emitted from the network node using an infrared LED.

In a sixth aspect, alone or in combination with one or more of the first through fifth aspects, the optical beacon is detectable using an infrared camera.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
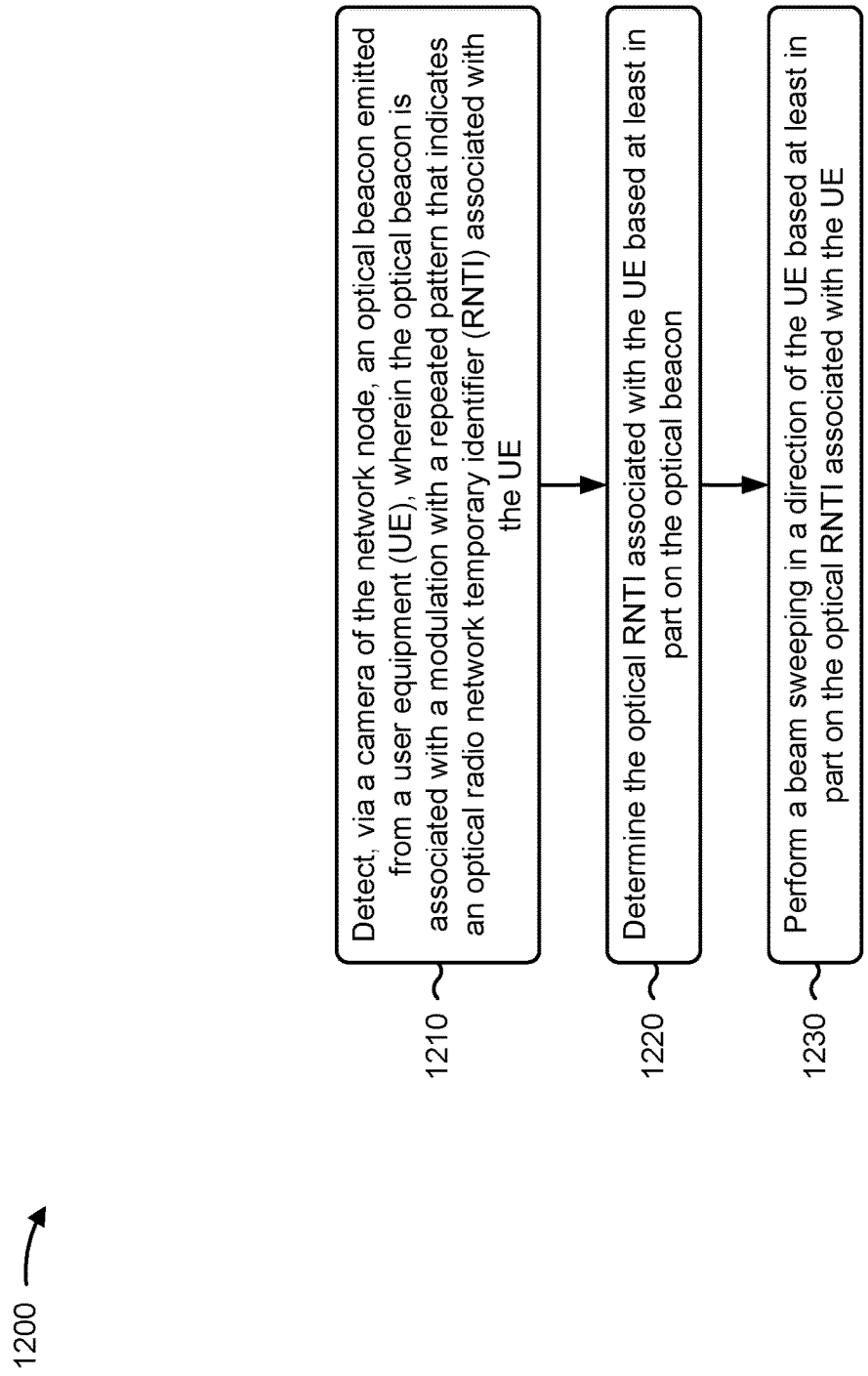

FIG. 12 is a diagram illustrating an example process 1200 performed, for example, by a network node, in accordance with the present disclosure. Example process 1200 is an example where the network node (e.g., network node 110) performs operations associated with transmitting optical beacons that indicate optical identifiers.

As shown in FIG. 12, in some aspects, process 1200 may include detecting, via a camera of the network node, an optical beacon emitted from a UE, wherein the optical beacon is associated with a modulation with a repeated pattern that indicates an optical RNTI associated with the UE (block 1210). For example, the network node (e.g., using communication manager 150 and/or detection component 1510, depicted in FIG. 15) may detect, via a camera of the network node, an optical beacon emitted from a UE, wherein the optical beacon is associated with a modulation with a repeated pattern that indicates an optical RNTI associated with the UE, as described above.

As further shown in FIG. 12, in some aspects, process 1200 may include determining the optical RNTI associated with the UE based at least in part on the optical beacon (block 1220). For example, the network node (e.g., using communication manager 150 and/or determination component 1512, depicted in FIG. 15) may determine the optical RNTI associated with the UE based at least in part on the optical beacon, as described above.

As further shown in FIG. 12, in some aspects, process 1200 may include performing a beam sweeping in a direction of the UE based at least in part on the optical RNTI associated with the UE (block 1230). For example, the network node (e.g., using communication manager 150 and/or transmission component 1504, depicted in FIG. 15) may perform a beam sweeping in a direction of the UE based at least in part on the optical RNTI associated with the UE, as described above.

Process 1200 may include additional aspects, such as any single aspect or any combination of aspects described below and/or in connection with one or more other processes described elsewhere herein.

In a first aspect, process 1200 includes transmitting, to the UE, a configuration that indicates the optical RNTI associated with the UE.

In a second aspect, alone or in combination with the first aspect, the configuration is transmitted via a sub-6 gigahertz message.

In a third aspect, alone or in combination with one or more of the first and second aspects, the optical RNTI is based at least in part on an optical cell identifier associated with the network node.

In a fourth aspect, alone or in combination with one or more of the first through third aspects, the optical RNTI is unique to the UE, and an association between an RNTI and the optical RNTI is established after a random access channel procedure between the network node and the UE.

In a fifth aspect, alone or in combination with one or more of the first through fourth aspects, the modulation is an OOK modulation that corresponds to an optical blinking pattern.

In a sixth aspect, alone or in combination with one or more of the first through fifth aspects, process 1200 includes receiving, from the UE, capability signaling indicating that the UE is capable of emitting optical beacons.

In a seventh aspect, alone or in combination with one or more of the first through sixth aspects, the optical beacon emitted from the UE is used to uniquely identify the UE.

In an eighth aspect, alone or in combination with one or more of the first through seventh aspects, the camera of the network node is an infrared camera.

In a ninth aspect, alone or in combination with one or more of the first through eighth aspects, the optical beacon is emitted from the UE using an infrared LED.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
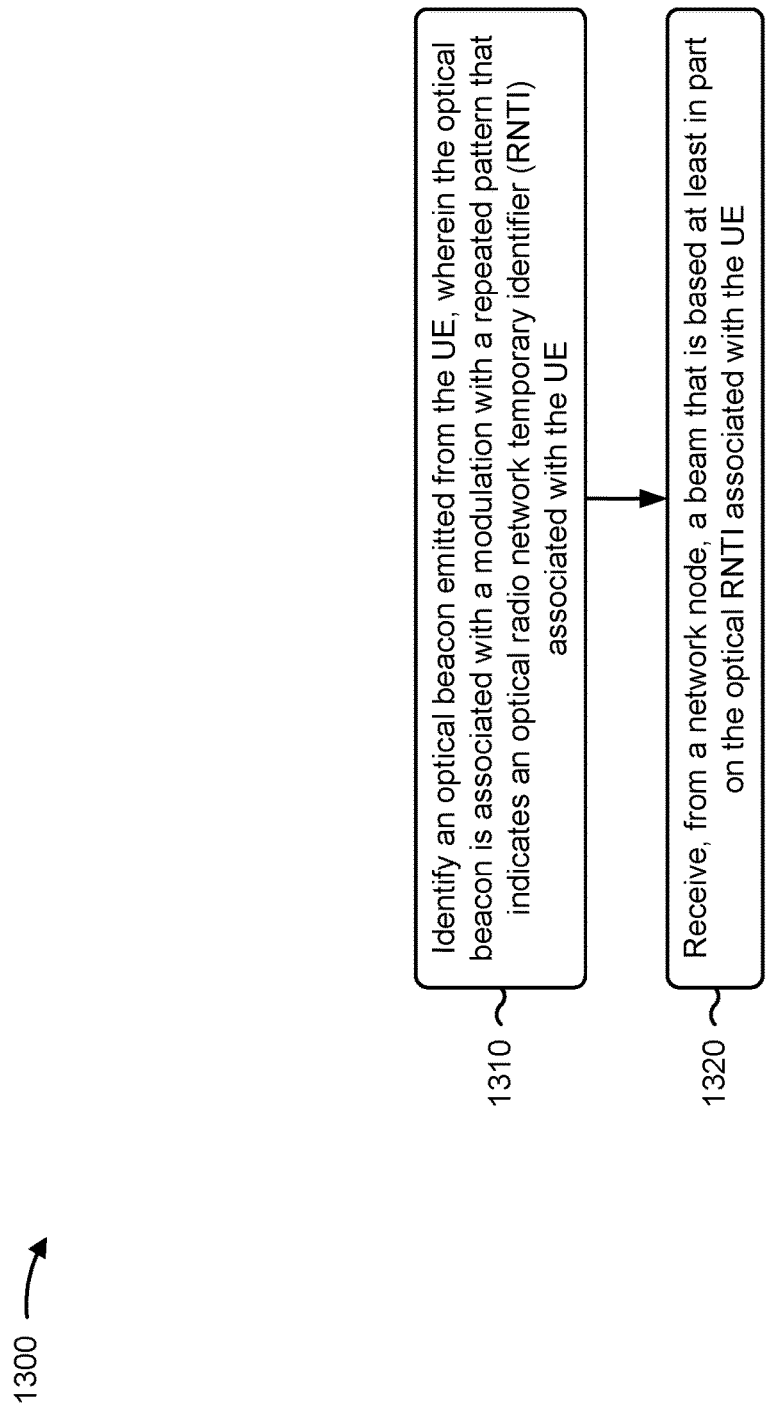

FIG. 13 is a diagram illustrating an example process 1300 performed, for example, by an UE, in accordance with the present disclosure. Example process 1300 is an example where the UE (e.g., UE 120) performs operations associated with transmitting optical beacons that indicate optical identifiers.

As shown in FIG. 13, in some aspects, process 1300 may include identifying an optical beacon emitted from the UE, wherein the optical beacon is associated with a modulation with a repeated pattern that indicates an optical RNTI associated with the UE (block 1310). For example, the UE (e.g., using communication manager 140 and/or identification component 1412, depicted in FIG. 14) may identify an optical beacon emitted from the UE, wherein the optical beacon is associated with a modulation with a repeated pattern that indicates an optical RNTI associated with the UE, as described above.

As further shown in FIG. 13, in some aspects, process 1300 may include receiving, from a network node, a beam that is based at least in part on the optical RNTI associated with the UE (block 1320). For example, the UE (e.g., using communication manager 140 and/or reception component 1402, depicted in FIG. 14) may receive, from a network node, a beam that is based at least in part on the optical RNTI associated with the UE, as described above.

Process 1300 may include additional aspects, such as any single aspect or any combination of aspects described below and/or in connection with one or more other processes described elsewhere herein.

In a first aspect, process 1300 includes receiving, from the network node, a configuration that indicates the optical RNTI associated with the UE.

In a second aspect, alone or in combination with the first aspect, the configuration is received via a sub-6 gigahertz message.

In a third aspect, alone or in combination with one or more of the first and second aspects, the optical RNTI is based at least in part on an optical cell identifier associated with the network node.

In a fourth aspect, alone or in combination with one or more of the first through third aspects, the optical RNTI is unique to the UE, and an association between an RNTI and the optical RNTI is established after a random access channel procedure between the UE and the network node.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
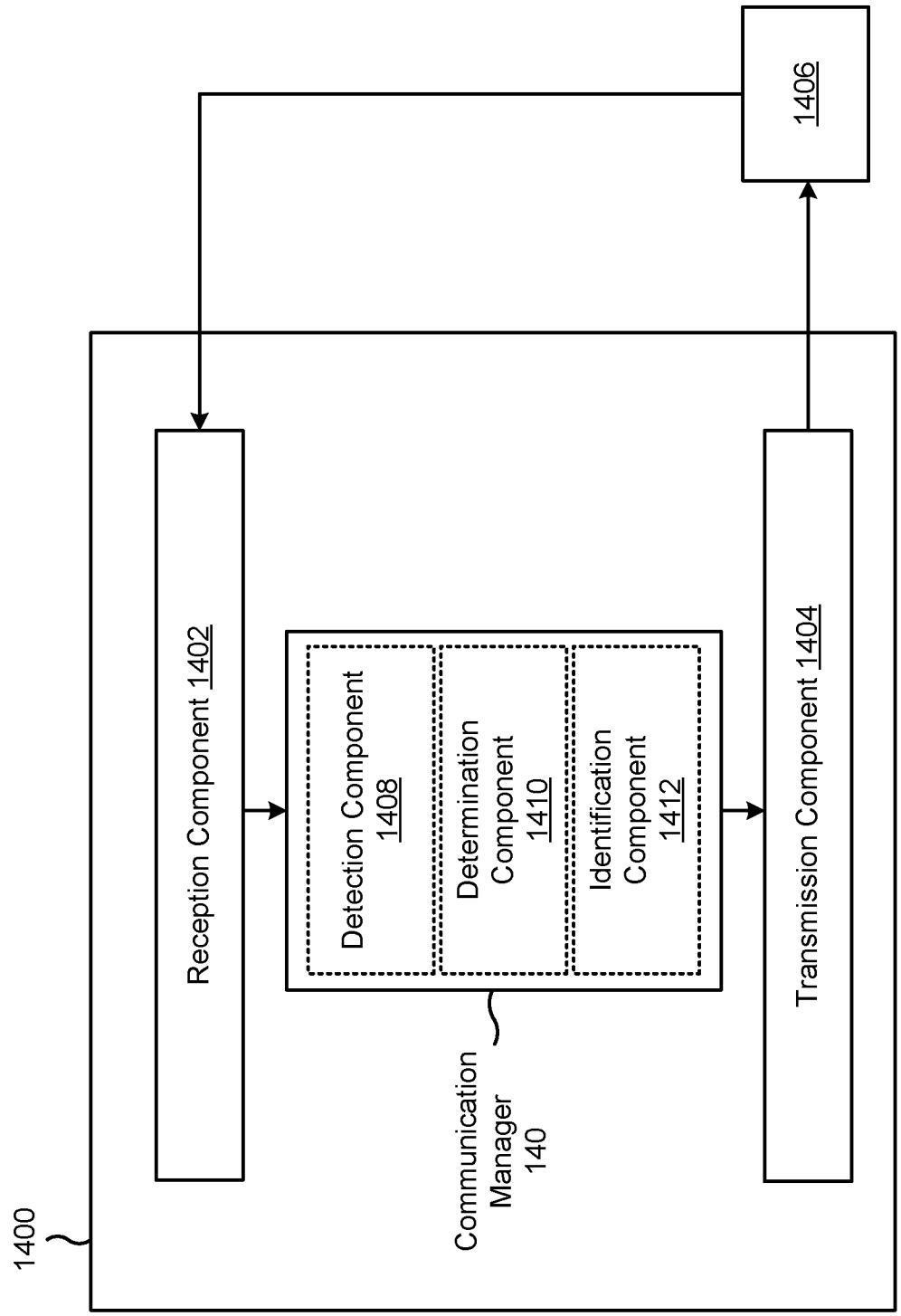
FIGS. 14-15 are diagrams of example apparatuses for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include one or more of a detection component 1408, a determination component 1410, or an identification component 1412, among other examples.

In some aspects, the apparatus 1400 may be configured to perform one or more operations described herein in connection with FIGS. 6-9. Additionally, or alternatively, the apparatus 1400 may be configured to perform one or more processes described herein, such as process 1000 of FIG. 10, process 1300 of FIG. 13, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The detection component 1408 may detect, via a camera of the UE, an optical beacon emitted from a network node, wherein the optical beacon is associated with a modulation with a repeated pattern that indicates an optical cell identifier associated with the network node. The determination component 1410 may determine the optical cell identifier associated with the network node based at least in part on the optical beacon. The reception component 1402 and/or the transmission component 1404 may communicate with the network node based at least in part on a beam association between the UE and the network node, wherein the beam association is based at least in part on the optical cell identifier associated with the network node.

The identification component 1412 may identify an optical beacon emitted from the UE, wherein the optical beacon is associated with a modulation with a repeated pattern that indicates an optical RNTI associated with the UE. The reception component 1402 may receive, from a network node, a beam that is based at least in part on the optical RNTI associated with the UE. The reception component 1402 may receive, from the network node, a configuration that indicates the optical RNTI associated with the UE.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
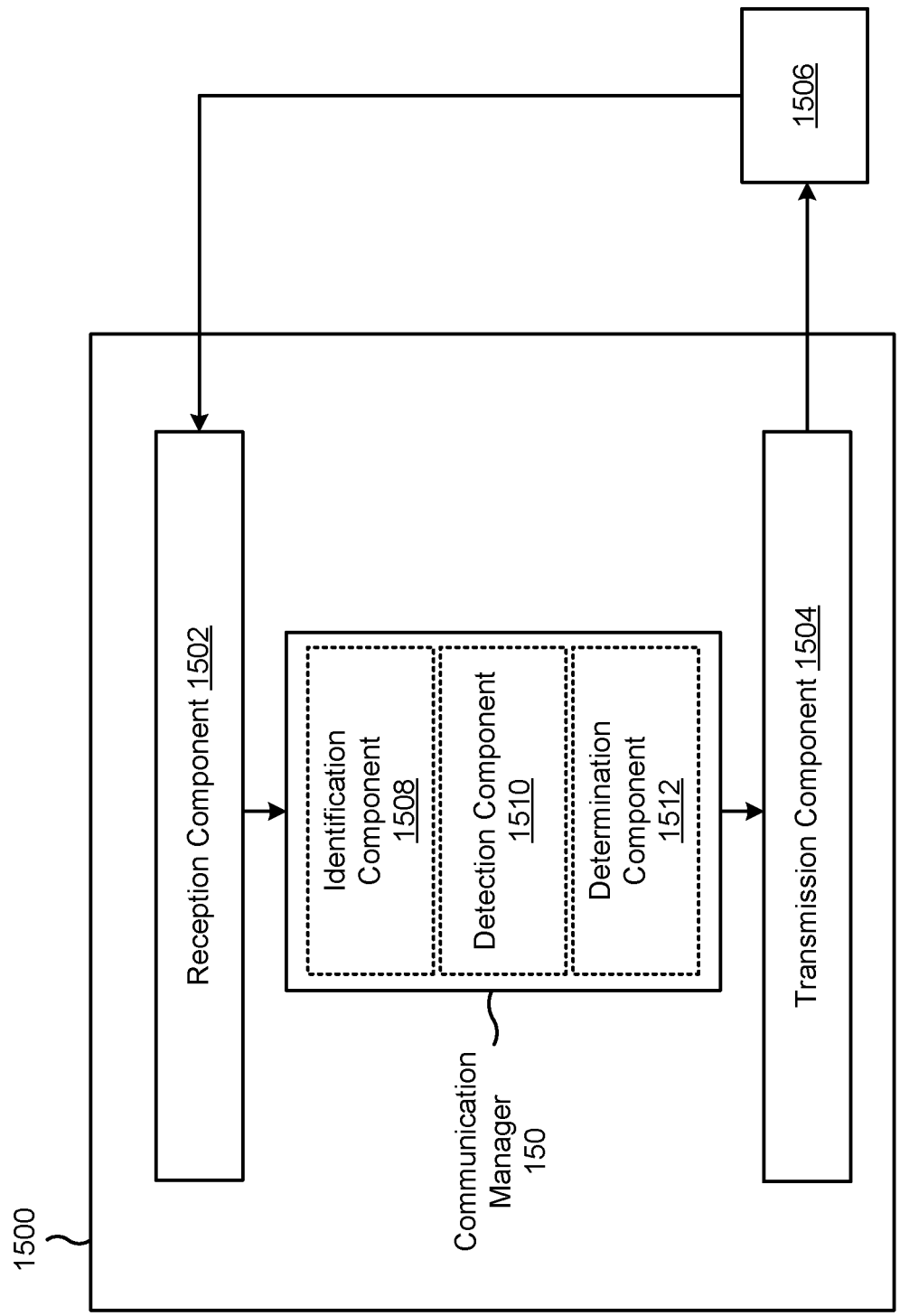

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include one or more of an identification component 1508, a detection component 1510, or a determination component 1512, among other examples.

In some aspects, the apparatus 1500 may be configured to perform one or more operations described herein in connection with FIGS. 6-9. Additionally, or alternatively, the apparatus 1500 may be configured to perform one or more processes described herein, such as process 1100 of FIG. 11, process 1200 of FIG. 12, or a combination thereof. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The identification component 1508 may identify an optical beacon emitted from the network node, wherein the optical beacon is associated with a modulation with a repeated pattern that indicates an optical cell identifier associated with the network node. The reception component 1502 and/or the transmission component 1504 may communicate, with a UE, based at least in part on a beam association between the network node and the UE, wherein the beam association is based at least in part on the optical cell identifier associated with the network node.

The detection component 1510 may detect, via a camera of the network node, an optical beacon emitted from a UE, wherein the optical beacon is associated with a modulation with a repeated pattern that indicates an optical RNTI associated with the UE. The determination component 1512 may determine the optical RNTI associated with the UE based at least in part on the optical beacon. The transmission component 1504 may perform a beam sweeping in a direction of the UE based at least in part on the optical RNTI associated with the UE. The transmission component 1504 may transmit, to the UE, a configuration that indicates the optical RNTI associated with the UE.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: detecting, via a camera of the UE, an optical beacon emitted from a network node, wherein the optical beacon is associated with a modulation with a repeated pattern that indicates an optical cell identifier associated with the network node; determining the optical cell identifier associated with the network node based at least in part on the optical beacon; and communicating with the network node based at least in part on a beam association between the UE and the network node, wherein the beam association is based at least in part on the optical cell identifier associated with the network node.

Aspect 2: The method of Aspect 1, wherein the optical cell identifier associated with the network node corresponds to a network cell identifier associated with the network node.

Aspect 3: The method of any of Aspects 1 through 2, wherein communicating with the network node is based at least in part on a cell association, and wherein the cell association is based at least in part on the optical cell identifier associated with the network node.

Aspect 4: The method of any of Aspects 1 through 3, wherein the modulation is an on-off keying modulation that corresponds to an optical blinking pattern.

Aspect 5: The method of any of Aspects 1 through 4, further comprising: transmitting, to the network node, capability signaling indicating that the UE is capable of detecting optical beacons emitted from the network node.

Aspect 6: The method of any of Aspects 1 through 5, wherein the optical beacon emitted from the network node is used to uniquely identify the network node.

Aspect 7: The method of any of Aspects 1 through 6, wherein the camera of the UE is an infrared camera.

Aspect 8: The method of any of Aspects 1 through 7, wherein the optical beacon is emitted from the network node using an infrared light emitting diode.

Aspect 9: A method of wireless communication performed by a network node, comprising: identifying an optical beacon emitted from the network node, wherein the optical beacon is associated with a modulation with a repeated pattern that indicates an optical cell identifier associated with the network node; and communicating, with a user equipment (UE), based at least in part on a beam association between the network node and the UE, wherein the beam association is based at least in part on the optical cell identifier associated with the network node.

Aspect 10: The method of Aspect 9, wherein the optical cell identifier associated with the network node corresponds to a network cell identifier associated with the network node.

Aspect 11: The method of any of Aspects 9 through 10, wherein the modulation is an on-off keying modulation that corresponds to an optical blinking pattern.

Aspect 12: The method of any of Aspects 9 through 11, further comprising: receiving, from the UE, capability signaling indicating that the UE is capable of detecting optical beacons emitted from the network node.

Aspect 13: The method of any of Aspects 9 through 12, wherein the optical beacon emitted from the network node is used to uniquely identify the network node.

Aspect 14: The method of any of Aspects 9 through 13, wherein the optical beacon is emitted from the network node using an infrared light emitting diode.

Aspect 15: The method of any of Aspects 9 through 14, wherein the optical beacon is detectable using an infrared camera.

Aspect 16: A method of wireless communication performed by a network node, comprising: detecting, via a camera of the network node, an optical beacon emitted from a user equipment (UE), wherein the optical beacon is associated with a modulation with a repeated pattern that indicates an optical radio network temporary identifier (RNTI) associated with the UE; determining the optical RNTI associated with the UE based at least in part on the optical beacon; and performing a beam sweeping in a direction of the UE based at least in part on the optical RNTI associated with the UE.

Aspect 17: The method of Aspect 16, further comprising: transmitting, to the UE, a configuration that indicates the optical RNTI associated with the UE.

Aspect 18: The method of Aspect 17, wherein the configuration is transmitted via a sub-6 gigahertz message.

Aspect 19: The method of any of Aspects 16 through 18, wherein the optical RNTI is based at least in part on an optical cell identifier associated with the network node.

Aspect 20: The method of any of Aspects 16 through 19, wherein the optical RNTI is unique to the UE, and wherein an association between an RNTI and the optical RNTI is established after a random access channel procedure between the network node and the UE.

Aspect 21: The method of any of Aspects 16 through 20, wherein the modulation is an on-off keying modulation that corresponds to an optical blinking pattern.

Aspect 22: The method of any of Aspects 16 through 21, further comprising: receiving, from the UE, capability signaling indicating that the UE is capable of emitting optical beacons.

Aspect 23: The method of any of Aspects 16 through 22, wherein the optical beacon emitted from the UE is used to uniquely identify the UE.

Aspect 24: The method of any of Aspects 16 through 23, wherein the camera of the network node is an infrared camera.

Aspect 25: The method of any of Aspects 16 through 24, wherein the optical beacon is emitted from the UE using an infrared light emitting diode.

Aspect 26: A method of wireless communication performed by a user equipment (UE), comprising: identifying an optical beacon emitted from the UE, wherein the optical beacon is associated with a modulation with a repeated pattern that indicates an optical radio network temporary identifier (RNTI) associated with the UE; and receiving, from a network node, a beam that is based at least in part on the optical RNTI associated with the UE.

Aspect 27: The method of Aspect 26, further comprising: receiving, from the network node, a configuration that indicates the optical RNTI associated with the UE.

Aspect 28: The method of Aspect 27, wherein the configuration is received via a sub-6 gigahertz message.

Aspect 29: The method of any of Aspects 26 through 28, wherein the optical RNTI is based at least in part on an optical cell identifier associated with the network node.

Aspect 30: The method of any of Aspects 26 through 29, wherein the optical RNTI is unique to the UE, and wherein an association between an RNTI and the optical RNTI is established after a random access channel procedure between the UE and the network node.

Aspect 31: An apparatus for wireless communication at a device, comprising a processor; memory coupled with the processor; and instructions stored in the memory and executable by the processor to cause the apparatus to perform the method of one or more of Aspects 1-8 or Aspects 26-30.

Aspect 32: A device for wireless communication, comprising a memory and one or more processors coupled to the memory, the one or more processors configured to perform the method of one or more of Aspects 1-8 or Aspects 26-30.

Aspect 33: An apparatus for wireless communication, comprising at least one means for performing the method of one or more of Aspects 1-8 or Aspects 26-30.

Aspect 34: A non-transitory computer-readable medium storing code for wireless communication, the code comprising instructions executable by a processor to perform the method of one or more of Aspects 1-8 or Aspects 26-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-8 or Aspects 26-30.

Aspect 36: An apparatus for wireless communication at a device, comprising a processor; memory coupled with the processor; and instructions stored in the memory and executable by the processor to cause the apparatus to perform the method of one or more of Aspects 9-25.

Aspect 37: A device for wireless communication, comprising a memory and one or more processors coupled to the memory, the one or more processors configured to perform the method of one or more of Aspects 9-25.

Aspect 39: A non-transitory computer-readable medium storing code for wireless communication, the code comprising instructions executable by a processor to perform the method of one or more of Aspects 9-25.

Aspect 10: A non-transitory computer-readable medium storing a set of instructions for wireless communication, the set of instructions comprising one or more instructions that, when executed by one or more processors of a device, cause the device to perform the method of one or more of Aspects 9-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
   detect, via a camera of the UE, an optical beacon emitted from a network node, wherein the optical beacon is associated with a modulation with a repeated pattern that indicates an optical cell identifier associated with the network node;

identify a direction of the network node and a position of the network node by image processing the optical beacon; and communicate with the network node using a beam between the UE and the network node, wherein the beam is based at least in part on the optical cell identifier associated with the network node and the beam is associated with the direction.

2. The apparatus of claim 1, wherein the optical cell identifier associated with the network node corresponds to a network cell identifier associated with the network node.

3. The apparatus of claim 1, wherein communicating with the network node is based at least in part on a cell association, and wherein the cell association is based at least in part on the optical cell identifier associated with the network node.

4. The apparatus of claim 1, wherein the modulation is an on-off keying modulation that corresponds to an optical blinking pattern.

5. The apparatus of claim 1, wherein the one or more processors are configured to:

transmit, to the network node, capability signaling indicating that the UE is capable of detecting optical beacons emitted from the network node.

6. The apparatus of claim 1, wherein the optical beacon emitted from the network node is used to uniquely identify the network node.

7. The apparatus of claim 1, wherein the camera of the UE is an infrared camera.

8. The apparatus of claim 1, wherein the optical beacon is emitted from the network node using an infrared light emitting diode.

9. An apparatus for wireless communication at a network node, comprising:

one or more memories; and one or more processors, coupled to the one or more memories, configured to:

identify an optical beacon emitted from the network node, wherein the optical beacon is associated with a modulation with a repeated pattern that indicates an optical cell identifier associated with the network node, and wherein the optical beacon identifies a direction of the network node and a position of the network node based on image processing of the optical beacon; and communicate, with a user equipment (UE), using a beam between the network node and the UE, wherein the beam is based at least in part on the optical cell identifier associated with the network node and the beam is in a direction that is based on the optical beacon.

10. The apparatus of claim 9, wherein the optical cell identifier associated with the network node corresponds to a network cell identifier associated with the network node.

11. The apparatus of claim 9, wherein the modulation is an on-off keying modulation that corresponds to an optical blinking pattern.

12. The apparatus of claim 9, wherein the one or more processors are configured to:

receive, from the UE, capability signaling indicating that the UE is capable of detecting optical beacons emitted from the network node.

13. The apparatus of claim 9, wherein the optical beacon emitted from the network node is used to uniquely identify the network node.

14. The apparatus of claim 9, wherein the optical beacon is emitted from the network node using an infrared light emitting diode.

15. The apparatus of claim 9, wherein the optical beacon is detectable using an infrared camera.

16. A method of wireless communication performed by a user equipment (UE), comprising:

detecting, via a camera of the UE, an optical beacon emitted from a network node, wherein the optical beacon is associated with a modulation with a repeated pattern that indicates an optical cell identifier associated with the network node;

performing image processing of the optical beacon to identify a direction of the network node and a position of the network node;

identifying a direction of the network node and a position of the network node by image processing the optical beacon; and communicating with the network node using a beam between the UE and the network node, wherein the beam is based at least in part on the optical cell identifier associated with the network node and the beam is associated with the direction.

17. The method of claim 16, wherein the optical cell identifier associated with the network node corresponds to a network cell identifier associated with the network node.

18. The method of claim 16, wherein communicating with the network node is based at least in part on a cell association, and wherein the cell association is based at least in part on the optical cell identifier associated with the network node.

19. The method of claim 16, wherein the modulation is an on-off keying modulation that corresponds to an optical blinking pattern.

20. The method of claim 16, comprising:

transmitting, to the network node, capability signaling indicating that the UE is capable of detecting optical beacons emitted from the network node.

21. The method of claim 16, wherein the optical beacon emitted from the network node is used to uniquely identify the network node.

22. The method of claim 16, wherein the camera of the UE is an infrared camera.

23. The method of claim 16, wherein the optical beacon is emitted from the network node using an infrared light emitting diode.

24. A method of wireless communication performed by a network node, comprising:

identifying an optical beacon emitted from the network node, wherein the optical beacon is associated with a modulation with a repeated pattern that indicates an optical cell identifier associated with the network node, and wherein the optical beacon identifies a direction of the network node and a position of the network node based on image processing of the optical beacon; and communicating, with a user equipment (UE), using a beam between the network node and the UE, wherein the beam is based at least in part on the optical cell identifier associated with the network node and the beam is in a direction that is based on the optical beacon.

25. The method of claim 24, wherein the optical cell identifier associated with the network node corresponds to a network cell identifier associated with the network node.

26. The method of claim 24, wherein the modulation is an on-off keying modulation that corresponds to an optical blinking pattern.

27. The method of claim 24, comprising:
receiving, from the UE, capability signaling indicating that the UE is capable of detecting optical beacons emitted from the network node.

28. The method of claim 24, wherein the optical beacon emitted from the network node is used to uniquely identify the network node.

29. The method of claim 24, wherein the optical beacon is emitted from the network node using an infrared light emitting diode.

30. The method of claim 24, wherein the optical beacon is detectable using an infrared camera.

* * * * *